US007445151B2

(12) United States Patent
Chu

(10) Patent No.: US 7,445,151 B2
(45) Date of Patent: *Nov. 4, 2008

(54) CARD PRINTER WITH A DUST-PROOF CARD RECEIVER

(75) Inventor: Kai-Min Chu, Taipei (TW)

(73) Assignee: HiTi Digital, Inc., Taipei (TW)

( * ) Notice: Subject to any disclaimer, the term of this patent is extended or adjusted under 35 U.S.C. 154(b) by 598 days.

This patent is subject to a terminal disclaimer.

(21) Appl. No.: 11/161,757

(22) Filed: Aug. 16, 2005

(65) Prior Publication Data

US 2007/0012768 A1 Jan. 18, 2007

(30) Foreign Application Priority Data

Jul. 12, 2005 (TW) .............................. 94218818 U

(51) Int. Cl.
*G06K 15/00* (2006.01)

(52) U.S. Cl. ........................ 235/383; 235/492; 400/521

(58) Field of Classification Search ................. 235/383, 235/385, 487, 492; 400/521, 693
See application file for complete search history.

(56) References Cited

U.S. PATENT DOCUMENTS

| | | | | |
|---|---|---|---|---|
| 6,315,283 | B1 * | 11/2001 | Haas et al. | 271/124 |
| 6,431,537 | B1 * | 8/2002 | Meier | 271/9.01 |
| 6,971,808 | B2 * | 12/2005 | Dawson | 400/521 |
| 7,334,953 | B2 * | 2/2008 | Chu | 400/521 |
| 2002/0105135 | A1 * | 8/2002 | Meier et al. | 271/121 |

* cited by examiner

*Primary Examiner*—Daniel St.Cyr
(74) *Attorney, Agent, or Firm*—Winston Hsu

(57) ABSTRACT

A card printer includes a housing having a card outlet and a connecting element for connecting to a connecting element of a dust-proof card receiver. The dust-proof card receiver includes an opening. A vertical distance between the opening and the bottom of the housing is approximately the same as a vertical distance between the card outlet and the bottom of the housing. When cards output from the card outlet of the housing accumulate to the height of the opening and the card printer continues to output printed cards, cards subsequently output from the card printer push an upper card inside the dust-proof card receiver out from the opening of the dust-proof card receiver.

4 Claims, 4 Drawing Sheets

CARD PRINTER WITH A DUST-PROOF CARD RECEIVER

BACKGROUND OF THE INVENTION

1. Field of the Invention

The present invention relates to a card printer, and more particularly, to a card printer with a dust-proof card receiver.

2. Description of the Prior Art

Cards printed by a card printer are directly output from a card outlet of the card printer to a card receiver externally connected to the housing of the card printer. Generally, the card receiver has no upper cover, and therefore newly printed cards can be output from the card printer even if the card receiver is full of cards. However, such a card receiver cannot protect cards from dust contamination.

SUMMARY OF THE INVENTION

It is therefore a primary objective of the claimed invention to provide a card printer with a dust-proof card receiver to solve the above-mentioned problem.

The claimed invention discloses a card printer comprising a housing and a card receiver. The housing comprises a card outlet formed on the housing for outputting a printed card, and a connecting element formed on the housing. The card receiver comprises a connecting element for engaging the connecting element of the housing to connect the card receiver to the housing, and an opening formed on the card receiver. A vertical distance between the opening and the bottom of the housing is approximately the same as a vertical distance between the card outlet and the bottom of the housing. When cards output from the card outlet of the housing accumulate to the height of the opening and the card printer continues to output printed cards, cards subsequently output from the card printer push an upper card inside the card receiver out from the opening of the card receiver.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
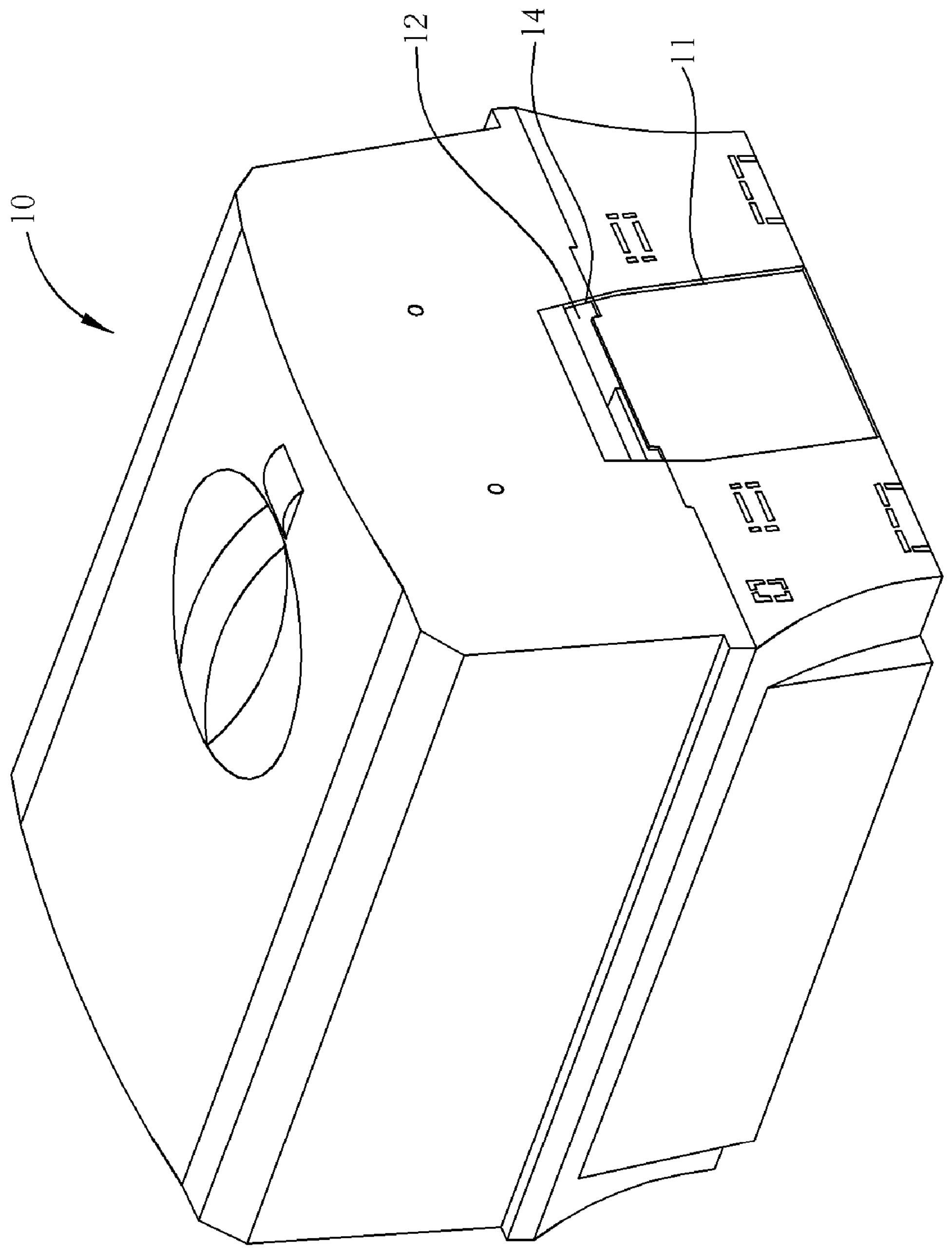
FIG. 1 is a diagram of a card printer according to the present invention.

In order to solve the problem of the prior art, the present invention provides structures of a card receiver and a card printer. Please refer to FIG. 1, which is a diagram of a card printer 10 according to the present invention. A housing of the card printer 10 comprises a concave contour 11, a card outlet 12, and two connecting holes 14. Printed cards are directly output from the card outlet 12.

Figure 2:
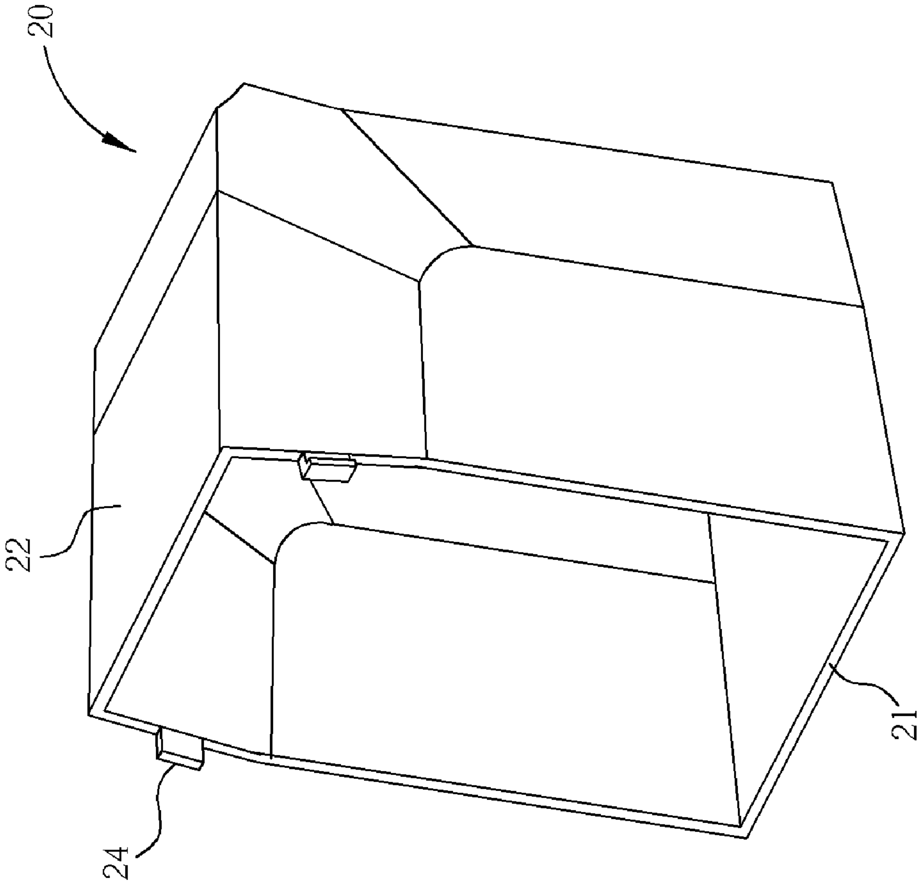
FIGS. 2 and 3 are diagrams of a card receiver based on the present invention.
Figure 3:
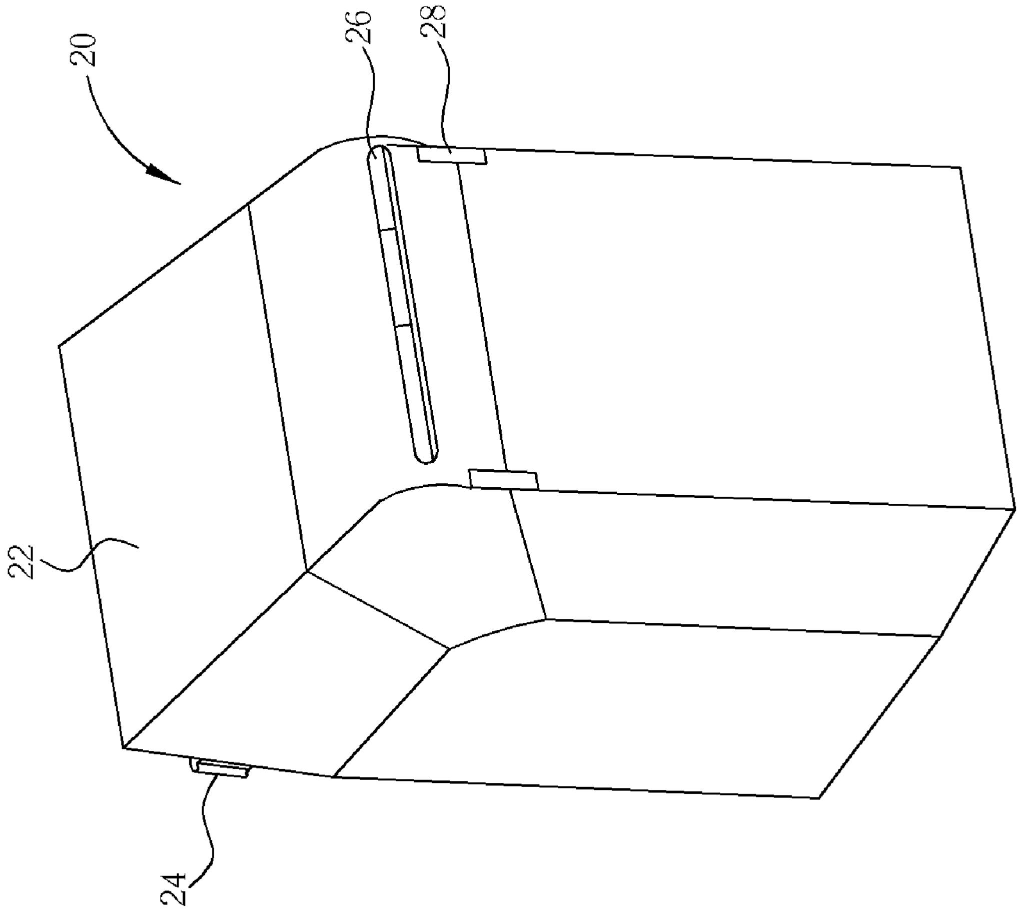

Please refer to FIGS. 2 and 3, which are diagrams of a card receiver 20 based on the present invention. The card receiver 20 comprises a connecting contour 21, an upper cover 22, two connecting elements 24, an opening 26, and two connecting holes 28. Each connecting element 24 engages the connecting hole 14 of FIG. 1 for connecting the card receiver 20 to the card printer 10. Inserting the connecting contour 21 of the card receiver 20 into the concave contour 11 of the card printer 10 makes the assembly of the card receiver 20 and the card printer 10 securer.

The upper cover 22 can protect printed cards from dust contamination. However, if there is no opening on the card receiver 20 for outputting cards, when the card receiver 20 is full of cards and the card printer 10 continues to print cards, cards subsequently printed by the card printer 10 cannot be output from the card printer 10. Therefore, the present invention provides the opening 26 on the card receiver 20 to solve this problem. A vertical distance between the opening 26 and the bottom of the housing of the card printer 10 is approximately the same as a vertical distance between the card outlet 12 and the bottom of the housing. When cards inside the card receiver 20 accumulate to the height of the opening 26 and the card printer 10 continues to output printed cards, cards subsequently output from the card printer 10 push an upper card inside the card receiver 20 out from the opening 26 of the card receiver 20. Therefore, the present invention can provide a solution to still output cards when the card receiver 20 is full of cards. In addition, the two connecting holes 28 of the card receiver 20 are capable of connecting to another card receiver similar to or the same as the card receiver 20.

Suppose that the card receiver 20 can accommodate 100 cards. When printing fewer than 100 cards, a card receiver 20 is needed to connect to the card outlet 12 of the card printer 10. If printed cards are over 100 cards but fewer than 200 cards, another similar or same card receiver 20 can be connect to the first card receiver 20. When the first card receiver 20 is full of cards, cards subsequently output from the card printer 10 can be out from the opening 26 of the first card receiver 20 to the second card receiver 20.

Figure 4:
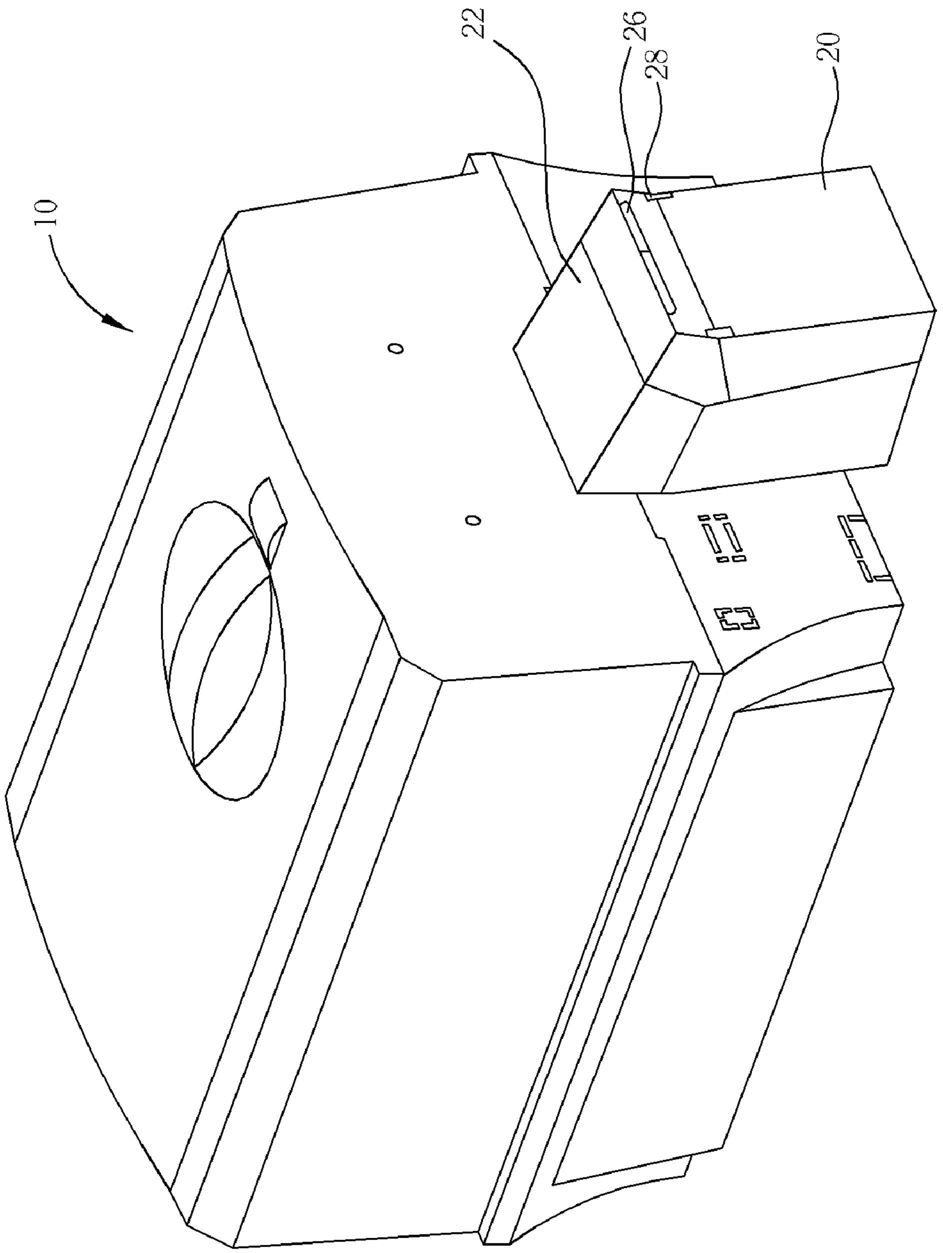
FIG. 4 is a diagram of the card receiver connected to the card printer according to the present invention.

Please refer to FIG. 4, which is a diagram of the card receiver 20 connected to the card printer 10 according to the present invention. The above example is not to be construed as limiting. Any other method capable of connecting the card printer 10 and the card receiver 20 can be implemented in the present invention.

Compared to the prior art, the card printer and the card receiver of the present invention can solve problems of the prior art. The present invention provides an opening on the card receiver corresponding to the height of the card outlet of the card printer, so that cards can be subsequently output from the card printer even if the card receiver is full of cards, and provides an upper cover on the card receiver to protect printed cards from dust contamination.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A card printer with a dust-proof card receiver, the card printer comprising:
- a housing comprising:
  - a card outlet formed on the housing for outputting a printed card; and
  - a connecting element formed on the housing; and
- a first card receiver comprising:
  - a first connecting element for engaging the connecting element of the housing to connect the first card receiver to the housing; and
  - an opening formed on the first card receiver, a vertical distance between the opening and the bottom of the housing approximately the same as a vertical distance between the card outlet and the bottom of the housing, wherein when cards output from the card outlet of the housing accumulate to the height of the opening and the card printer continues to output printed cards, cards subsequently output from the card printer push an upper card inside the card receiver out from the opening of the card receiver.

2. The card printer of claim 1, wherein the first card receiver further comprises a second connecting element for engaging a connecting element of a second card receiver.

3. The card printer of claim 1, wherein the first card receiver further comprises an upper cover.

4. The card printer of claim 1, wherein the housing further comprises a concave contour, and the first card receiver further comprises a connecting contour for insertion into the concave contour of the housing.

* * * * *

UNITED STATES PATENT AND TRADEMARK OFFICE

CERTIFICATE OF CORRECTION

PATENT NO. : 7,445,151 B2
APPLICATION NO. : 11/161757
DATED : November 4, 2008
INVENTOR(S) : Kai-Min Chu It is certified that error appears in the above-identified patent and that said Letters Patent is hereby corrected as shown below:

On the title page, item (30), correct the application number of Foreign Application Priority Data from “94218818 U” to “94211818 U”

Signed and Sealed this

Twenty-third Day of December, 2008

JON W. DUDAS

*Director of the United States Patent and Trademark Office*